United States Patent

[11] 3,590,936

| [72] | Inventors | Henry W. Wessells, III<br>Paoli;<br>Walter S. Eggert, Jr., Huntingdon Valley,<br>both of, Pa. |
|---|---|---|
| [21] | Appl. No. | 844,999 |
| [22] | Filed | July 25, 1969 |
| [45] | Patented | July 6, 1971 |
| [73] | Assignee | The Budd Company<br>Philadelphia, Pa. |

[54] STRUCTURE OF A MOTOR VEHICLE
4 Claims, 4 Drawing Figs.

[52] U.S. Cl. .................................................. 180/64 R,
296/28 R
[51] Int. Cl. ..................................................... B60k 5/12,
B62d 23/00
[50] Field of Search .......................................... 180/64, 54;
54.4 296/28

[56] References Cited
UNITED STATES PATENTS

| 2,096,541 | 10/1937 | Haltenberger | 180/54 (.4) |
| 2,199,517 | 5/1940 | Best | 180/54 (.4) |
| 2,871,968 | 2/1959 | Giacosa | 180/54 (A) |
| 3,047,331 | 7/1962 | Porsche et al. | 296/28 X |
| 3,455,595 | 7/1969 | Wessells III et al. | 296/28 (.4) UX |

FOREIGN PATENTS

| 829,206 | 3/1938 | France | 180/57 |

Primary Examiner—Benjamin Hersh
Assistant Examiner—Milton L. Smith
Attorneys—Thomas I. Davenport, Edward M. Farrell, John B. Sowell, Alford L. Trueax, Jr. and William R. Nolte ABSTRACT: A vehicle rear structure of a unitized body structure for supporting a rear-mounted engine and providing reinforced collision resistant bumper-supporting structure. The engine mount consists of a pair of crossbeams connected to the integral sidesills having studs and nuts secured thereon for attaching the engine. The sidesills are fabricated from an L-shaped angle section, the rear floor pan and inner uniside panels.

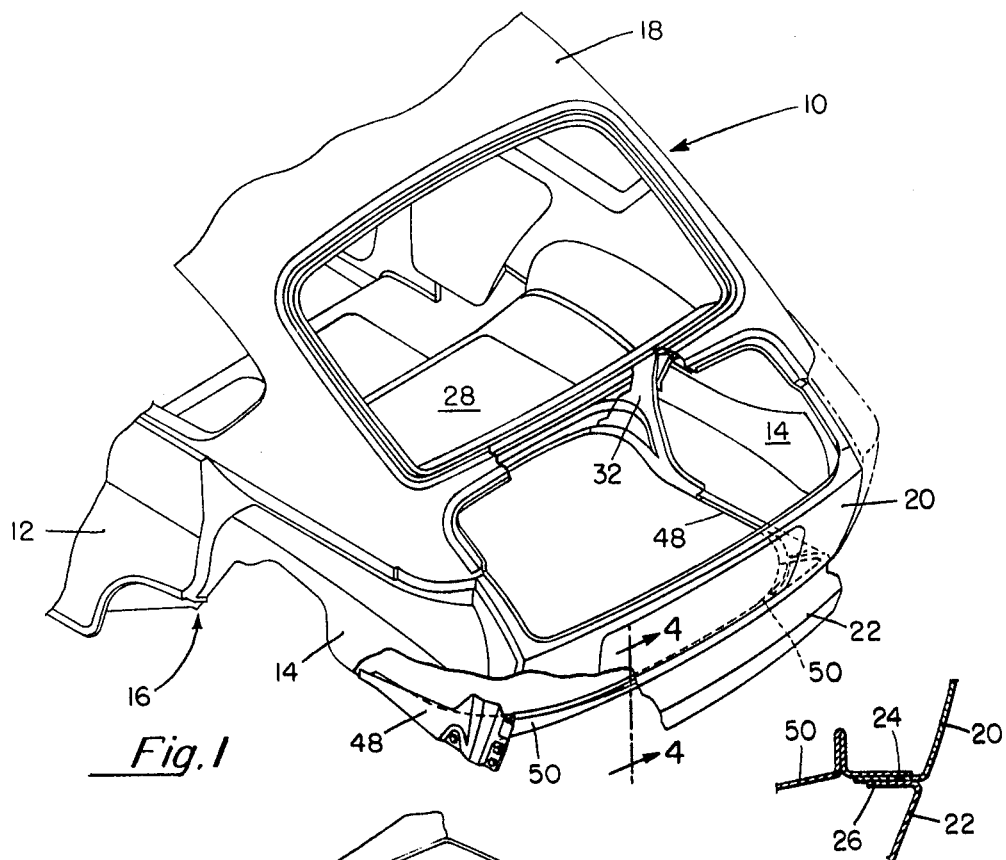
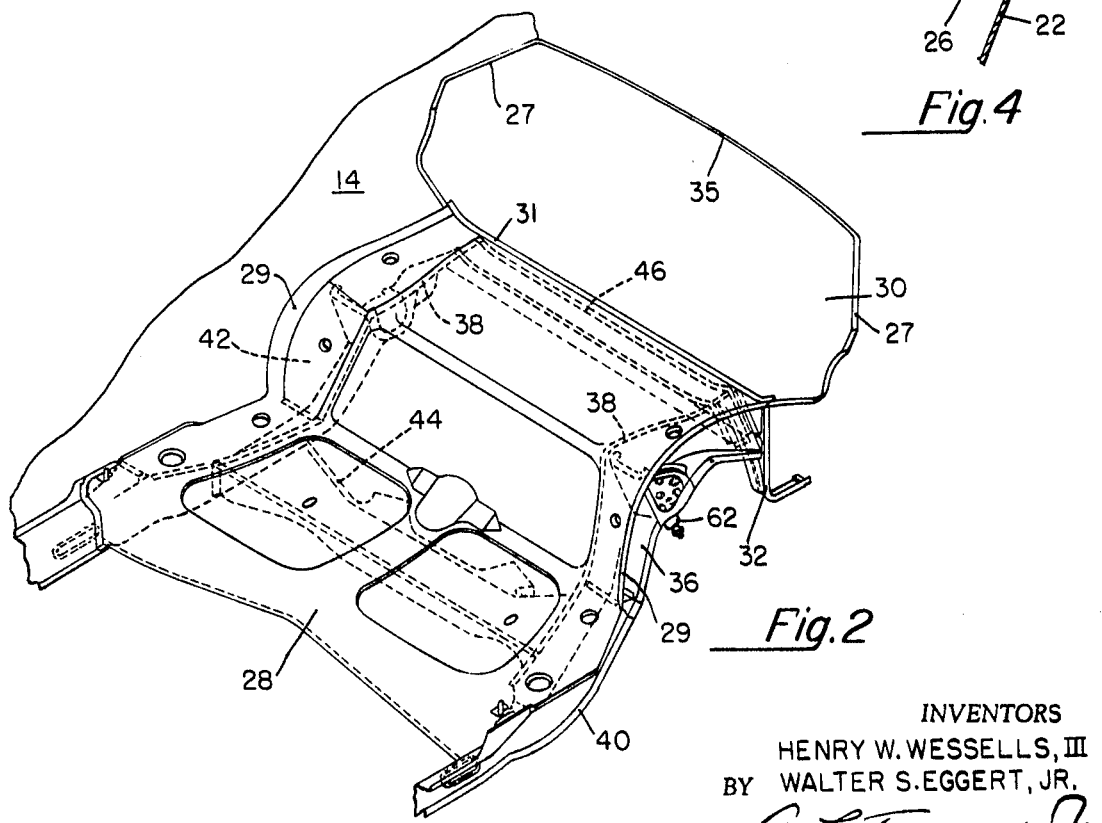

STRUCTURE OF A MOTOR VEHICLE

This invention relates to a rear engine mounted unitized vehicle body and more particularly to a novel means of body structure for providing the engine support and reinforced rear bumper support utilizing the inner uniside panel of an uniside as a shear panel.

To eliminate the normal heavy frame of the conventional separate body and frame construction, a unitized vehicle body was designed. This novel invention eliminated a heavy frame or stub frame by combining an L-shaped angle section, a portion of the uniside units and the rear floor pan to fabricate an integral frame structure. The integral frame structure provides lateral support for the vehicle engine by supporting a pair of crossbeam engine supports extending transversely of the vehicle body and having attaching means for suspending the vehicle engine thereon. An extension of the integral frame structure also supports the rear bumper and strengthens the rear body structure to resist collisions.

The object of this invention is to provide a novel lightweight rear body structure for supporting a rear-mounted engine and for providing reinforcing structure to resist collision forces applied to the bumper.

This and other objects of this invention will become apparent as reference is made to the following specification and drawings wherein:

FIG. 1 is a perspective view of a rear body structure for a motor vehicle with sections broken away to illustrate the novel structure.

FIG. 2 is a perspective view of the L-shaped angle sections connected to the rear floor pan, crossmembers and the inner uniside panel.

FIG. 4 is a view in the direction of the arrows 4—4 of FIG. 1 to illustrate the attachment of the rear engine closeoff braces and the rear panel and lower rear panel.

Figure 3:
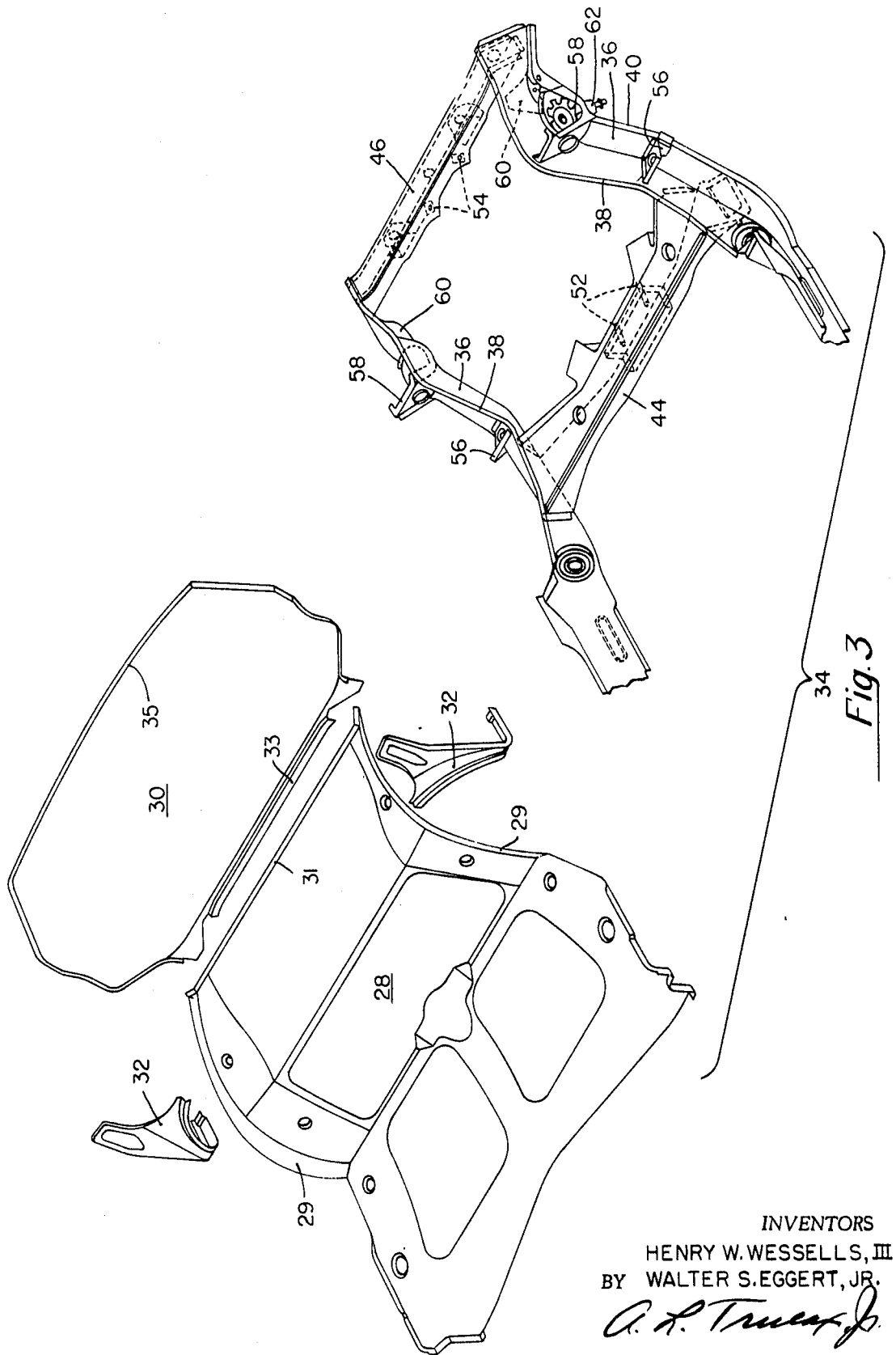
FIG. 3 is an exploded view of FIG. 2 for better illustrating the components of the fabricated sidesills.

In this vehicle body, the various components are symmetrical about the centerline of the vehicle. Therefore, equivalent but opposite components on the right and left side of the body will be given the same identification number. The joining of the various components is preferably by welding but could be accomplished by other suitable means.

Referring now to the drawings, as best seen in FIG. 1, an integral body frame structure for a vehicle with a rear-mounted engine includes a pair of outer uniside panels 12 joined to a pair of inner uniside panels 14 to form the respective right and left uniside units 16 in a conventional manner. A roof panel 18 is connected to the tops of the uniside units and a rear panel 20 and a lower rear panel 22 are joined to each other by their respective attaching flanges 24, 26 and to the rear of the uniside units 16 to form the body shell.

A rear floor pan 28 having upraised flanges 29 along the side edges is connected along its rear edge 31 to an engine closeoff pan 30. Pan 30 is provided with a lower edge 33, an upper edge 35 and side edges 27. The rear floor pan 28 and the closeoff pan 30 extend between and are joined to the inner uniside panels 14 by flanges 29 and 27 respectively. A pair of engine closeoff extensions 32 are joined to the engine closeoff pan 30 and the adjacent inner uniside panel 14 thereby separating the engine compartment from the passenger compartment of the vehicle.

As best seen in FIGS. 2 and 3, the engine support structure 34 includes the rear floor pan 28, engine closeoff extensions 32 and a pair of L-shaped channel members 36 extending longitudinally of the body. The L-shaped channel members 36 have one attaching flange 38 extending substantially at a right angle from one arm of the L and parallel to the floor pan 28 for being attached thereto by welding and a second attaching flange 40 extending substantially at a right angle from the other arm of the L and parallel to the adjacent inner uniside panel 14 for being attached thereto by welding. Thus, the L-shaped channel members 36 being joined to the rear floor pan 28 and the adjacent inner uniside panel 14 form a box-shaped rear sidesill 42 along each side of the vehicle body 10.

A front crossmember engine support 44 and a rear crossmember engine support 46 extend between the L-shaped channel members 36 and have each of the ends thereof attached to the adjacent channel member 36.

Referring now to FIG. 1, joined to and extending rearwardly from each of the engine closeoff extensions 32 are rear bumper mounting brackets 48. Each of the rear bumper mounting brackets 48 is joined to an engine closeoff extension 32 and to the adjacent inner uniside panel 14. A rear engine closeoff brace 50 extends across the rear of the vehicle body 10 having each end thereof joined to the adjacent rear bumper mounting bracket 48. As seen in FIG. 4, the lower attaching flange 24 of the rear panel 20 is secured to the rear engine closeoff brace 50 and is thereby reinforced by the brace.

As best seen in FIG. 3 a pair of attaching bolts or studs 52 are secured to the box-shaped front crossmember 44 and a pair of attaching nuts 54 are secured to the box-shaped rear crossmember 46 for securing and supporting the vehicle engine (not shown).

Referring now to FIGS. 2 and 3, the box-shaped rear sidesills 42 are reinforced by bulkhead supports 56 and a pair of rear spring bulkhead reinforcements 58 that are secured inside the formed box sections and a pair of inner shock mounting brackets 60 secured to the outer surface of the L-shaped channel member 36. A rear spring retainer 62 is secured to the outer side of the L-shaped channel member 36 to sandwich the channel member between the spring retainer 62 and the rear spring bulkhead reinforcement 58. The weight of the rear of the vehicle body and engine is supported on the rear axle (not shown) as connected through the rear springs (not shown) attached to the rear spring retainer 62 and the rear shocks (not shown) attached to the inner shock mounting brackets 60.

With the engine supported on crossmember engine supports 44, 46 the weight thereon is supported on the L-shaped channel members 36 to which the engine supports 44, 46 are secured. The channel member 36, rear floor pan 28 and inner uniside panel 14 form the box-shaped rear sill 42 which resists the upward support of the rear springs and shocks and the downward pull of the body and engine weight. Thus, it can be seen, the inner uniside panel 14 acts as a shear panel to help balance these counterforces instead of using a conventional heavy frame structure.

The collision resisting structure consists of the rear bumper mounting brackets 48 which are welded to the inner uniside panels 14 and to the rear engine closeoff braces 50 extending across the rear of the vehicle body 10. The rear mounting brackets 48 are adapted to support a rear bumper (not shown) and disperse any collision forces applied thereto through the open box structure which includes the inner uniside panels 14, the rear panel 20, lower rear panel 22 and the rear engine closeoff braces secured thereto, the engine closeoff extensions 32, the engine closeoff pan 30 and a portion of the roof panel 18.

While but one embodiment of the invention has been shown and explained various modifications are obvious without departing from the scope of the following claims.

We claim:

1. In an integral body-frame structure for an automotive vehicle having an engine mounted in the rear, said body-frame structure including a pair of uniside units, each of said uniside units comprising an inner uniside panel and an outer uniside panel secured thereto, a roof panel secured to said uniside units, a rear panel secured between the rear ends of said uniside units and a lower rear panel secured to said rear panel and to the rear of said uniside panels, a floor pan extending between said uniside units and having opposite edges thereof secured to the respective inner uniside panels of said uniside units, a generally rectangularly shaped engine closeoff pan having a portion thereof adjacent the lower edge of the pan secured to the edge of said floor pan, the opposite edge thereof secured to said roof panel and the remaining opposed edges being secured to the respective inner uniside panels of said uniside units; thereby forming a rear open box structure including the roof panel, the uniside units, the engine closeoff pan, the rear panel and the lower rear panel.

2. The body-frame structure as claimed in claim 1 wherein the rear open box structure includes reinforcement having an engine closeoff extension adjacent each uniside unit secured to said closeoff pan and the adjacent inner uniside panel, a rear bumper mounting bracket connected to and extending rearwardly from each of said engine closeoff extensions and secured to said adjacent inner uniside panel, and an engine closeoff brace extending between and connected to said rear bumper mounting brackets and secured to said rear panel and said lower rear panel.

3. The body-frame structure as claimed in claim 2 having a rear engine support including an L-shaped channel member extending generally longitudinally of said vehicle body adjacent to and secured to each of said uniside units, said engines, said closeoff pan, and said floor pan, a front crossmember extending between said channel members and having each end thereof secured to the adjacent channel member, a rear crossmember extending between said channel members and having each end thereof secured to the adjacent channel member, and engine-attaching means on each of said crossmembers for cooperatively securing and supporting said engine thereon.

4. The vehicle body structure as claimed in claim 3 wherein said engine-attaching means includes a pair of threaded studs secured to said front crossmember and a pair of threaded mounting nuts secured to said rear crossmember for receiving cooperating members of an engine for supporting the engine from the corssmembers in the engine compartment.